O. W. JOHNSON & W. A. READE.
TYPOGRAPH MACHINE.
APPLICATION FILED SEPT. 29, 1913.
1,192,205.
Patented July 25, 1916.
7 SHEETS—SHEET 7.
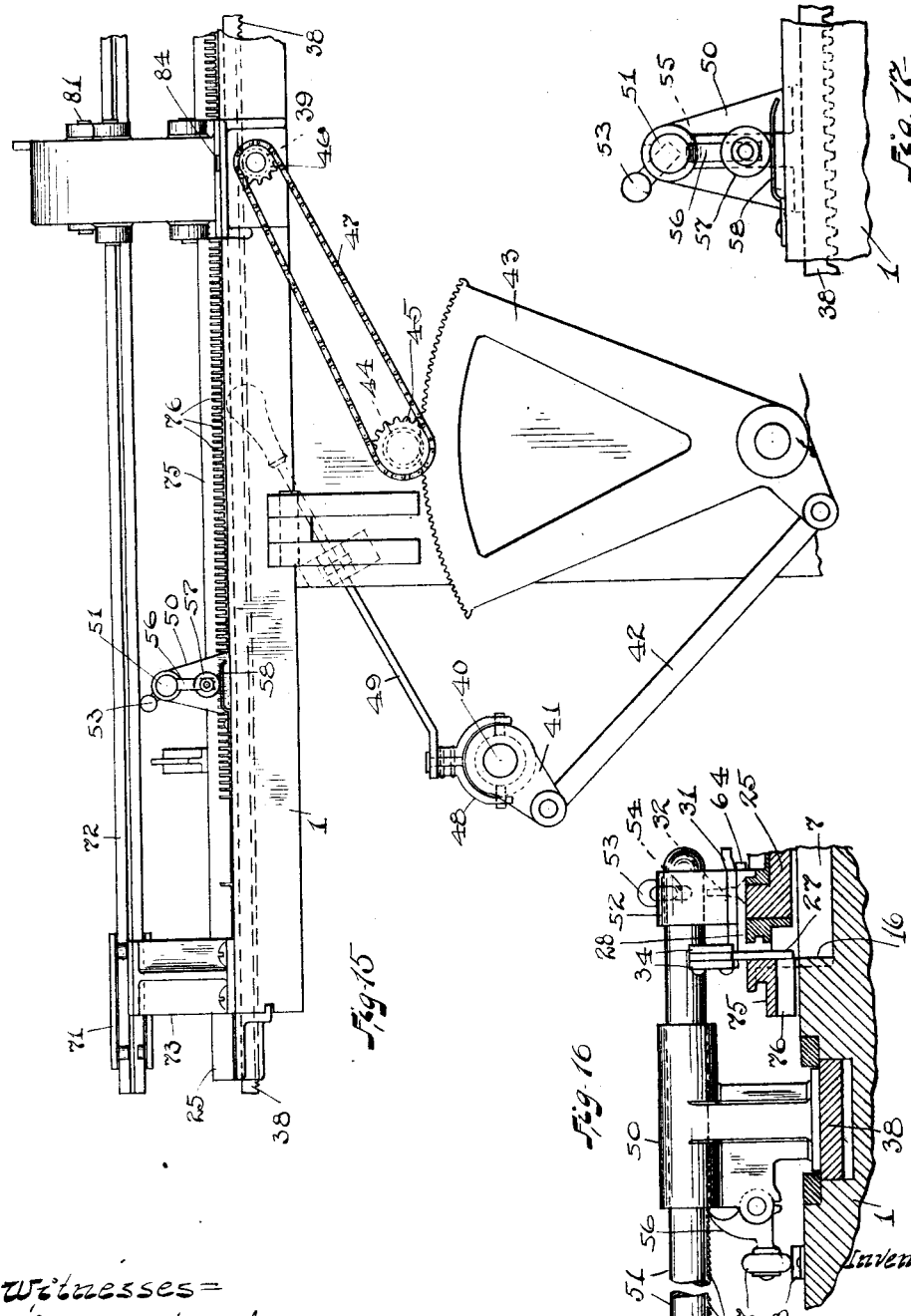

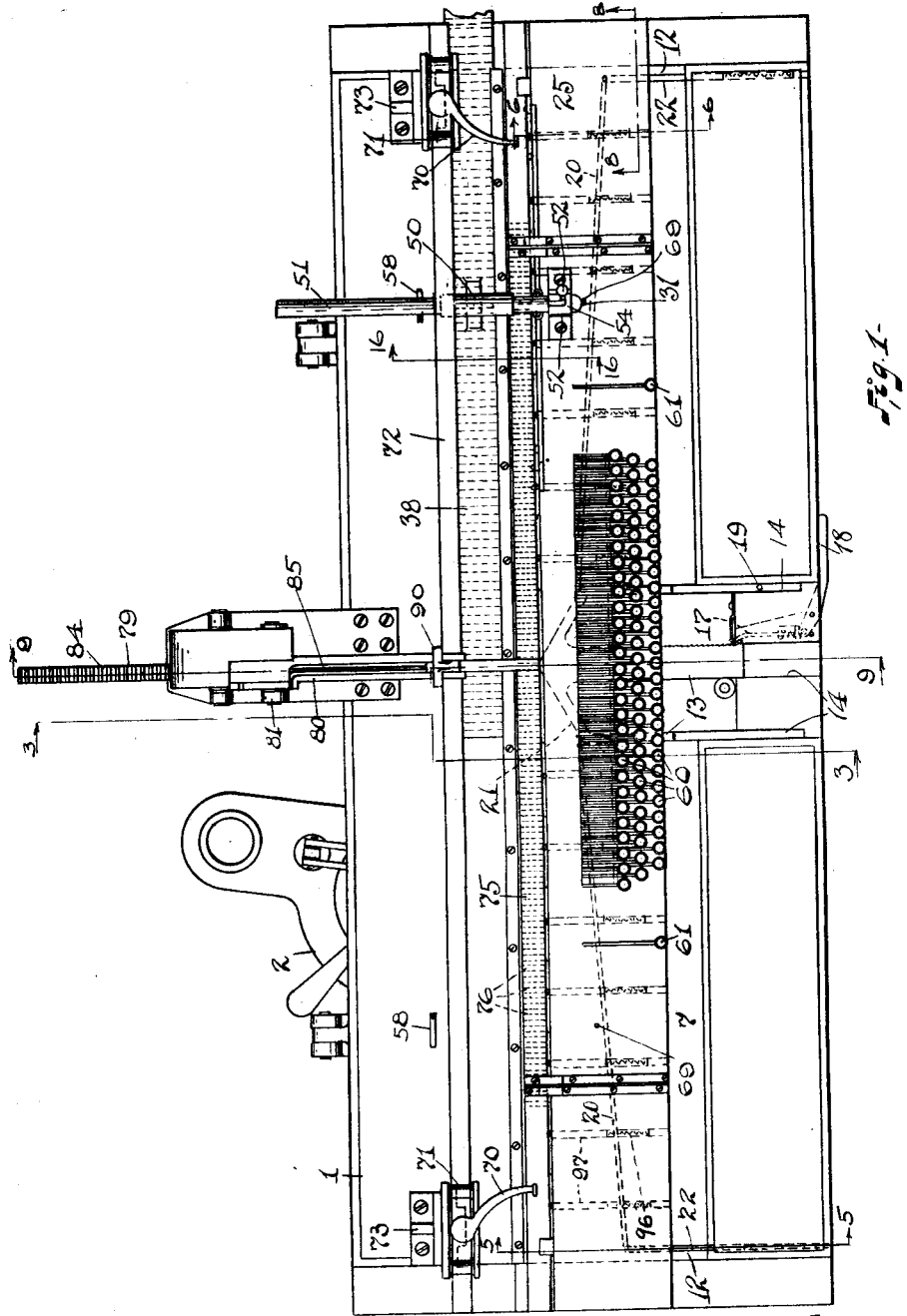

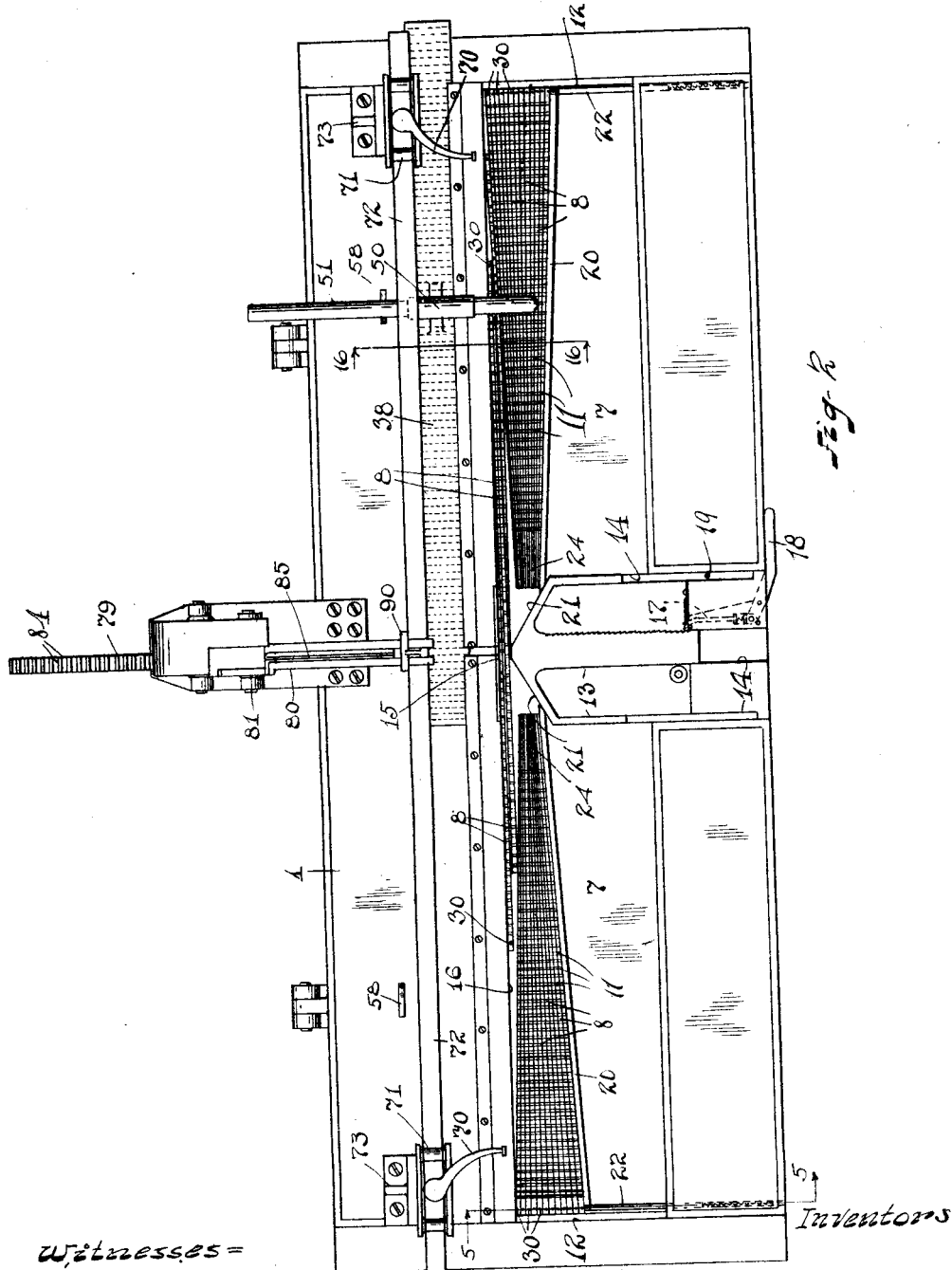

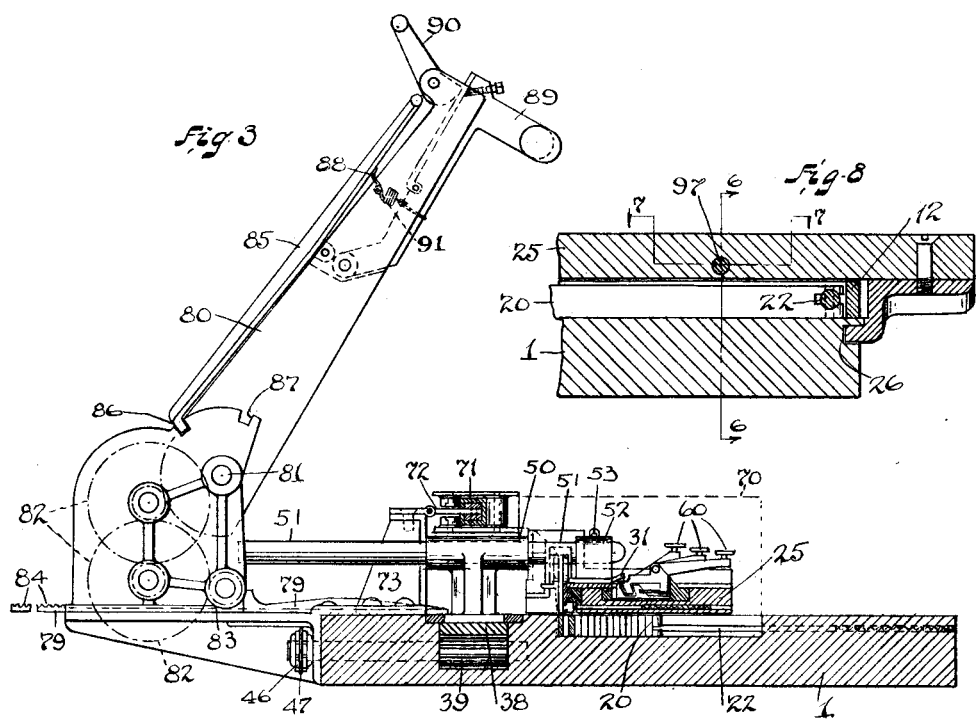
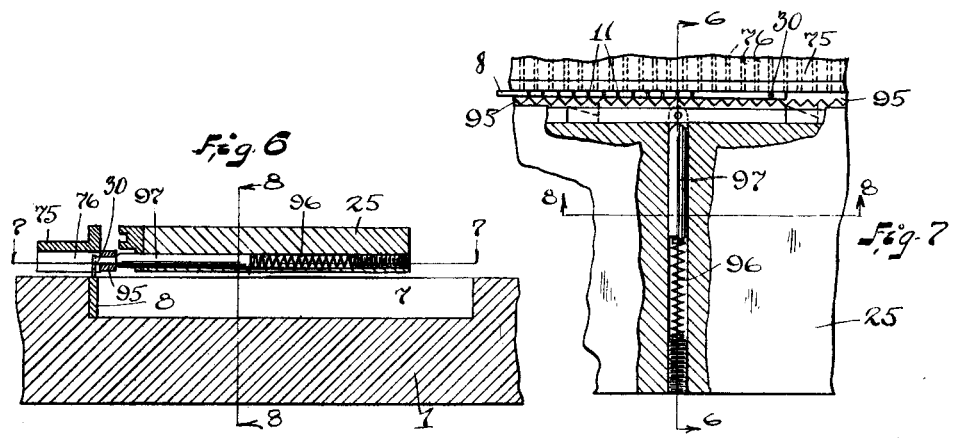

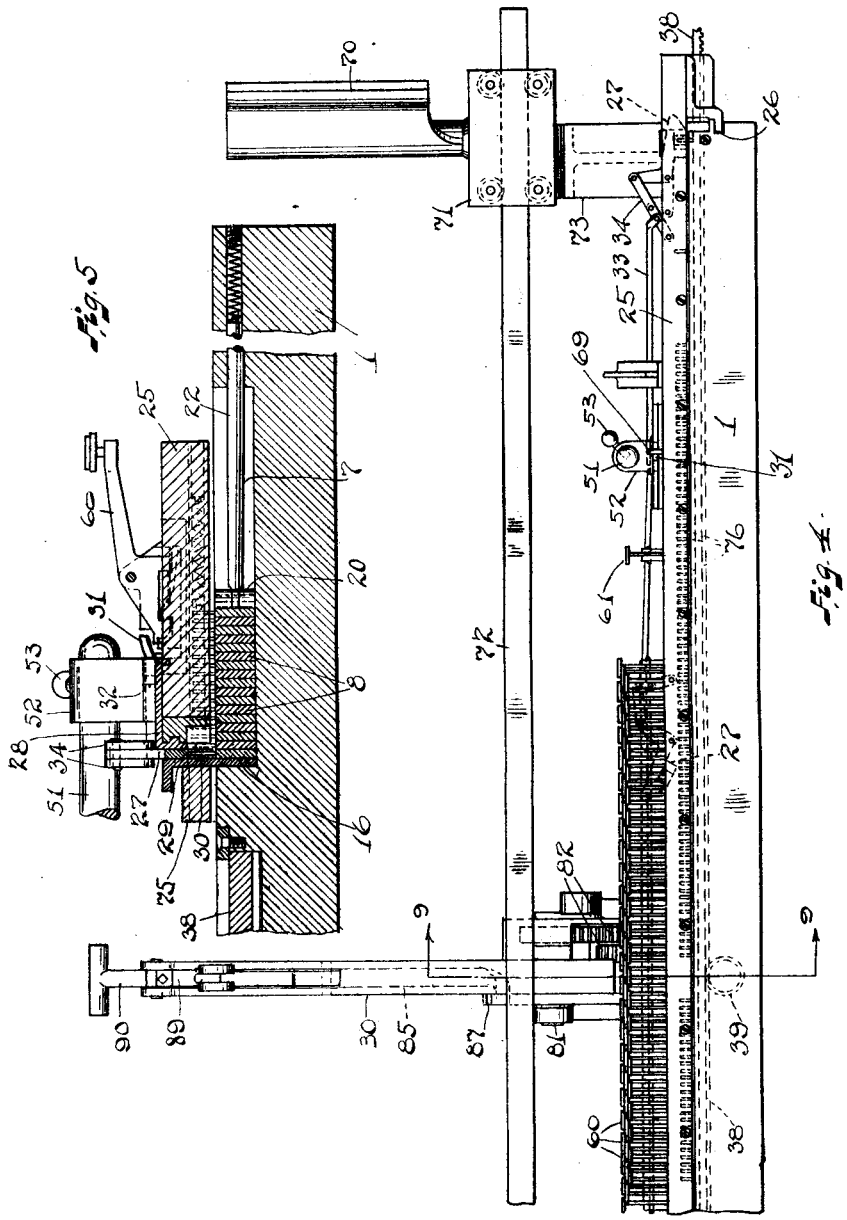

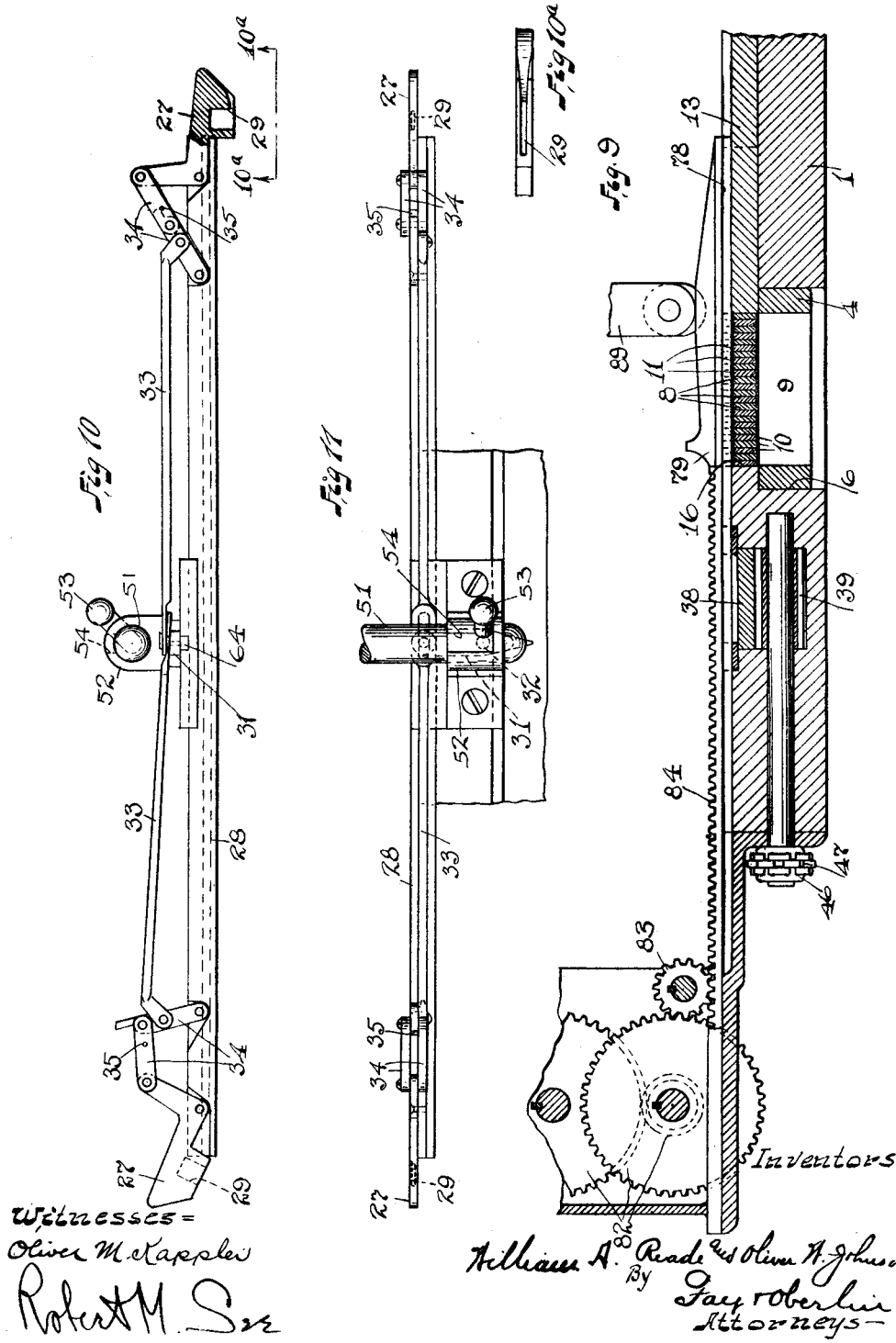

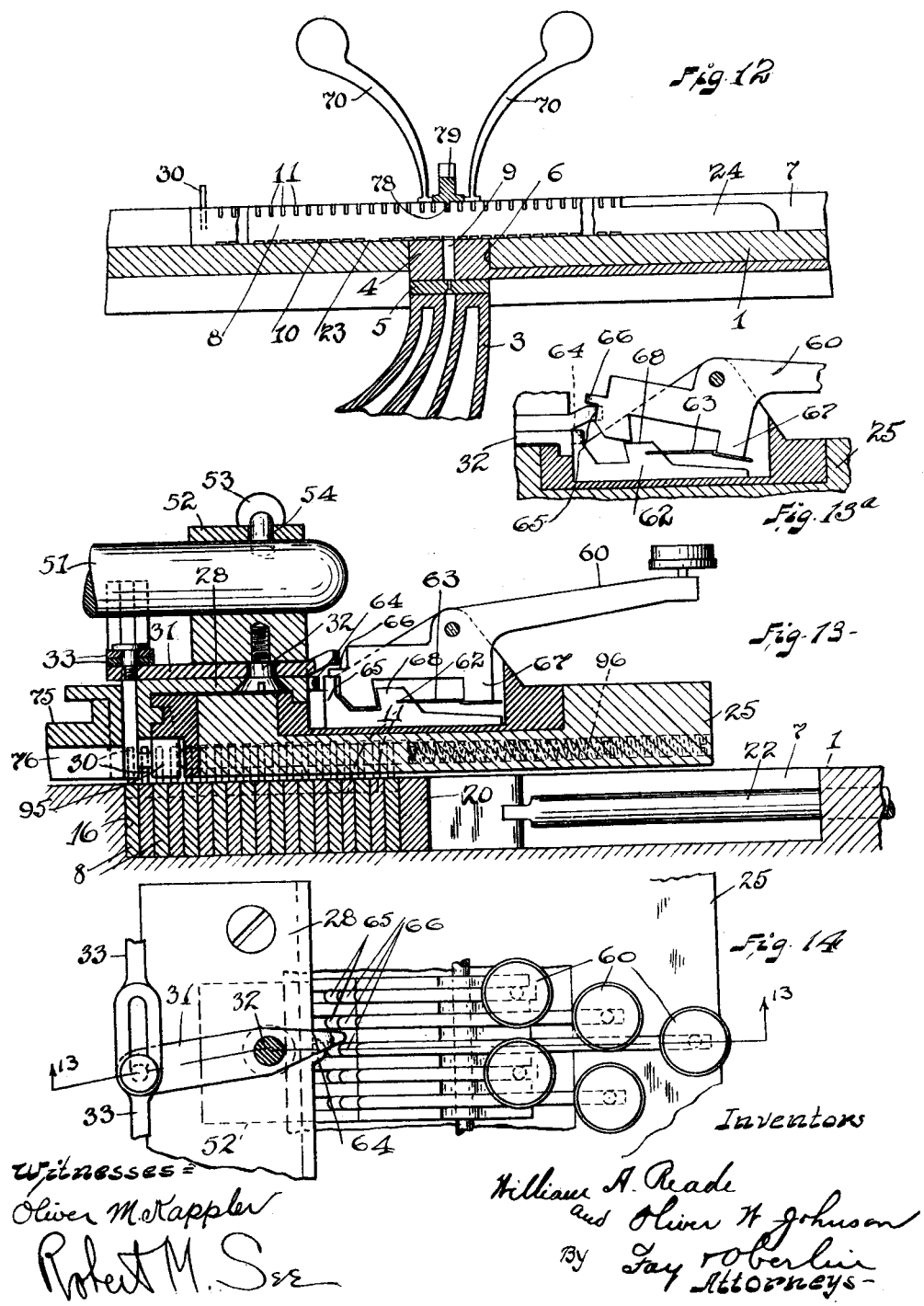

UNITED STATES PATENT OFFICE.

OLIVER W. JOHNSON AND WILLIAM A. READE, OF CLEVELAND, OHIO; SAID JOHNSON ASSIGNOR TO SAID READE.

TYPOGRAPH-MACHINE.

1,192,205. Specification of Letters Patent. Patented July 25, 1916.

Application filed September 29, 1913. Serial No. 792,410.

*To all whom it may concern:*

Be it known that we, OLIVER W. JOHNSON and WILLIAM A. READE, citizens of the United States, and residents of Cleveland, county of Cuyahoga, State of Ohio, have jointly invented a new and useful Improvement in Typograph-Machines, of which the following is a specification, the principle of the invention being herein explained and the best mode in which we have contemplated applying that principle, so as to distinguish it from other inventions.

The present improvements, relating as indicated to typograph mechanism, pertain more particularly to the so-called "Ludlow" typograph in which the means for casting the type-bars or slugs, comprise a body of matrix bars adapted to be distributed, or moved relatively to each other, so as to variously aline the duplicate series of matrices which they carry, and thus compose any desired word or series of words. In the simpler form of the "Ludlow" typograph, the bars are shifted by hand, the only mechanism that is provided, aside from the casting mechanism proper, comprising means for insuring the proper alinement of the distributed bars and for locking them during the casting operation.

The present improvements have as their object the provision of a simple keyboard mechanism whereby the manual handling of the bars just referred to may be obviated, thereby rendering the operation more convenient and at the same time increasing the speed with which the type bars may be set up and cast.

To the accomplishment of the foregoing and related ends, the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a plan view of the composing mechanism of our improved typograph; Fig. 2 is a view similar to Fig. 1, but with the keyboard mechanism and other parts removed so as to show the arrangement of the matrix bars; Fig. 3 is partly an end elevational view and partly a transverse section of the mechanism, the plane of the section being indicated by the line 3—3, Fig. 1; Fig. 4 is a front elevational view of the same the left-hand portion of the mechanism being omitted; Fig. 5 is a transverse sectional view taken on the plane indicated by the line 5—5, Figs. 1 and 2; Fig. 6 is a transverse cross-sectional view of a portion of the mechanism as indicated by the section line 6—6, Fig. 1; Fig. 7 is a section of the same detail in a horizontal plane as indicated by the line 7—7, Fig. 6; Fig. 8 is a section of such detail at right angles to the section of Fig. 6, as indicated by the line 8—8, Figs. 1 and 6; Fig. 9 is a transverse vertical section of another part of the mechanism, as indicated by the line 9—9, Figs. 1, 2 and 4; Fig. 10 is a side elevation, Fig. 10[a] a bottom plan view, and Fig. 11 a top plan view of the bar moving and setting mechanism; Fig. 12 is a section at right angles to that of Fig. 9, as indicated by the line 10—10, Fig. 9; Figs. 13 and 13[a] are side elevations, and Fig. 14, a plan view, both on a larger scale than Figs. 1, 3 and 4, and showing a detail of the key-board mechanism proper; Fig. 15 is a rear elevational view of the mechanism showing certain power operating means; Fig. 16 is a part elevational and part sectional view of a detail of this mechanism, as indicated by the line 16—16, Figs. 1 and 2; and Fig. 17 is a rear elevational view of said detail, viewing the same from the left in Fig. 12.

The general supporting frame for the mechanism constituting the present improvements is not illustrated, but merely the bed plate or top 1 of such frame, which is utilized as the base or support for the mechanism herein involved. The frame proper, it may be explained, is also utilized to support the casting mechanism for the slugs or type-bars made from the matrix provided by the present typograph mechanism proper, as will be more fully explained, but such casting mechanism forms no part of the present invention, and accordingly only so much of it is shown as is necessary to an understanding of the composing mechanism.

In fact such casting mechanism, so far as shown, consists merely of a casting pot 2 suitably mounted below the bed plate 1 which supports the typograph mechanism of present interest so as to be capable of bringing its nozzle or spout 3 (Fig. 12) into proper coöperative relationship with the mold 4 wherein the slug or type-bar is formed, when metal is supplied thereto from such pot. Such casting pot spout is terminally closed by a squirt-plate 5 that is designed to be brought directly against the under side of the mold when desired, and then removed so as to permit such mold to be lowered from the bed of the machine in order that the slug may be ejected therefrom and such further operations be performed on such slug as are necessary, preliminarily to its removal to the galley.

When in position for casting in the fashion just described, the mold 4 is designed to register with an opening 6 in the bed plate 1 such opening being disposed transversely of a longitudinally extending depression or trough 7 in such bed, and it is over the mold, when in this position, that the matrix bars 8 are designed to be placed in properly distributed fashion so as to provide a composite matrix of selected characters directly over the slot 9 in said mold. Such mold is designed, of course, to fit snugly in the opening 6 in the bed plate and with its upper face flush with the bottom of the trough, so that the bars may be longitudinally moved across the same without impediment.

The detailed construction of the matrix bars need be only briefly noted. The major portion of such bars, or, as illustrated, the entire body thereof, are preferably made of laterally tapered form, the taper being continuous from one end to the other end, as shown for example in Fig. 2. The matrices 10 are struck in, or otherwise formed on, the lower edges of the bars, regarding the latter as they rest on the trough bottom or equivalent support (see Figs. 9 and 12); while their upper edges are provided with transverse grooves 11 corresponding in position with such matrices, such upper edges being further provided with a series of characters (not shown) that likewise correspond with such matrices.

In their normal inoperative position the body of bars is divided into two groups as shown in Fig. 1, with their larger, or butt, ends directed outwardly, and their inner, or pointed ends, directed inwardly. The ribs 12, forming in effect end walls for the trough 7 that supports the bars, serve as stops to limit the outward movement and determine the location of the inner ends of the bars, when thus assembled in normal position. Such inner ends are designed in this position of the bars to lie on opposite sides of the casting slot 9 in the mold 4 when in place in the bottom of the trough, being engaged by the oppositely inclined faces of a block 13 that is slidably mounted, so as to be adjustable transversely of the trough in line with such casting slot, said block being supported in grooves, or ways, 14 formed in the bed of the machine. The inner end of the block is preferably flattened as at 15, such flat face forming in effect an adjustable abutment, or front wall, to the trough, between which and the rear fixed wall 16 of such trough, the bars 8 are distributed incidentally to the composing operation which will be presently described. This slidable block 13 is designed to fit sufficiently tight in the ways 14 to remain in whatever position it is left; it may, however, be advanced inwardly, with a step by step movement, by the action of a normally inoperative pawl 17, which is adapted to be actuated by a lever 18 as will be readily understood. A pin 19, removably fitted in a suitable hole in one of the ways 14, serves as a stop to normally determine the amount that block 13, may be retracted. By taking out such pin, however, the block is free to move outwardly until it reaches the ends of its ways.

The spaces between the block and the respective ends of the trough are closed by movable walls in the form of bars 20 of substantially the same length as the matrix bars. The inner ends of these bars slidably contact with the corresponding inclined faces 21 of the block, while their outer ends are attached to spring-pressed plungers 22 extending transversely into the trough, the tendency of each plunger being to force the corresponding movable wall-member against the adjacent collection of bars and thus force the latter in turn against the rear wall 16 of the trough 7.

In distributing the bars 8 for composing matrices over the casting slot, the innermost bar of first the one collection and the other is moved inwardly (that is from one body toward the other) so as to advance its thin end until it contacts with the corresponding inclined face 21 of the block 13; such face will then guide the end in question toward the rear wall 16, either directly into contact with such wall in the case of the very first bar, or in contact with such bars as may have been previously interposed. The bars are thus advanced outwardly from opposite sides and are moved varying distances, depending on which matrix character on the under face of the bar it is desired to locate over the casting slot. As clearly shown in Fig. 2, the butt end of any such advanced bar acts as a fulcrum as it were for the adjacent collection or body of undistributed bars, so that the action of the corresponding spring-pressed plunger 22 is to maintain such undistributed body of bars at all times in compact form with their thin ends close together and resting on the corresponding inclined face 21 of the block 13.

As successive bars are advanced and left in selected position, the block 13 will be forced gradually away from the rear wall 16, until eventually enough bars have been brought across the casting slot to compose a full line, or approximately a full line. In order to provide for space in the line thus formed, as between successive words, or at the end of the line, blanks are left between the matrices at different points on the under edges of the bars, as at 23, Fig. 12, and in addition the thin extremities 24 are left blank for a certain distance back from the end. If a space of predetermined width is desired, a selected blank 23 is brought over the casting slot. For the purpose of justification, however, a blank of adjustable width is required, and this is obtained by overlapping two such thin ends 24, just sufficiently to insure the bars sliding past each other. The determination of the space thus provided for may then be left until the line is completed, or substantially completed, when, by forcing together such paired bars, the space can be entirely filled and the line thus justified. The block 13, moreover, can be forced in, to clamp the assembled bars very tightly, by actuating the lever 18, in the final casting operation.

Supported over the trough 7 so as to be movable transversely of the same is a movable platform or carriage 25, Figs. 1, 3, 4 and 5. Such carriage is slidably supported at its respective ends on guides 26 formed in the bed plate 1 of the machine, and this carriage, which in effect bridges the trough from end to end, serves to support the keyboard mechanism and other parts more or less directly connected with the shifting of the matrix bars in the trough, as will presently be described.

The primary means for distributing the bars comprise a device which is adapted to positively engage with successive bars in the respective groups collected at each end of the trough and move such bars toward the center, the keyboard mechanism being arranged to coöperate with such positive acting device to release each bar when it is brought into a predetermined position.

The primary distributing device just referred to, as designed for moving and setting the bars, consists of a pair of oppositely disposed fingers or catches 27 of the form clearly shown in Figs. 10 and 11, such catches being pivotally attached near the respective ends of a bar 28 slidably mounted on the carriage 25 near the latter's rear edge and capable of movement parallel with such edge. Each such catch 27 is formed with a recess 29 adapted to hook over a projection in the form of a pin 30 in the butt end of a matrix bar 8, and thus temporarily connect the shiftable bar 28 that carries the catch, with such matrix bar for the purpose of shifting the latter. For operating the catches, an oscillatory lever 31 is provided pivotal about an axis 32 and having a lost motion connection with the inner ends of two rods 33, the outer ends of which are respectively connected to toggle levers 34, which in turn are adapted to actuate said catches, the arrangement being such that when a rod is actuated outwardly it will straighten the toggle with which it is connected and thus depress the catch to engage the pin on a bar located therebeneath. Undue straining of the toggle is prevented by a pin 35 which will allow the joint to bend only so far. Conversely, inward movement of either rod 33 will bend the corresponding toggle and raise the catch connected therewith so as to release the pin on the bar engaged by said catch.

The slide 28 which carries the catches 27 is reciprocated, preferably automatically, by power means at a predetermined rate of speed, and to this end a second reciprocable slide in the form of a rack 38 is provided on the upper face of the bed of the machine and to the rear of the trough 7, such rack being actuated in the specific structure illustrated in the drawings by an arrangement of gearing shown in detail in Fig. 15. This gearing comprises a pinion 39 disposed to engage the teeth of the rack and adapted to be driven from a power shaft 40 carrying a short lever 41 that is connected by a rod 42 to oscillate a segmental gear 43. The latter is connected by means of a pinion 44, pulleys 45, 46 and a chain 47 to communicate its motion to the aforesaid pinion 39. Obviously the segmental gear will be alternately oscillated in opposite directions, and this motion will be translated into a corresponding reciprocation of the rack bar through its engagement with said pinion. A clutch 48, operable by a hand-lever 49, is adapted to connect or disconnect the lever 41 with the shaft 40, as desired.

The range of movement of the rack 38, is such as to carry it from the position illustrated in full lines in Figs. 1 and 2, where it is shown as lying for the most part at the right of a transverse median line of the machine, to a corresponding position on the other side of such median line. Such range of movement, in other words, is sufficient to carry the slide 28 and catches 27 back and forth, so that the catches will alternately be enabled to engage with the pins on the butt ends of the bars at the respective ends of the trough.

The connection between the rack and the slide is designed to be such that not only will such slide be moved in unison with the rack, but means are also provided for imparting a step by step movement to the slide and thereby to the carriage or platform, transversely of the trough, incidentally to each reciprocation of the rack and slide. The means in question are shown in plan in Figs. 1 and 2, and in side and rear elevation in Figs. 16 and 17, respectively. Said means comprise in such illustrated form a bracket or standard 50 mounted on the rack 38 near its midpoint, in which bracket there is reciprocably and rotatably held a rod or bar 51, the forward end of which is adapted to detachably engage with a somewhat similar bracket or standard 52 mounted on the slide 28. Such forward end of the rod is provided with a pin 52 terminating in a knob and forming a convenient handle whereby the rod 51 may be secured in a bayonet slot 54 in said bracket 52 when desired, and at the same time quickly and easily detached if the operator wants to separate the slide and carriage from the rack.

The side of the rod 51 which is disposed downwardly, when it is in position where the pin 53 engages the bracket 52 on the slide, is provided with serrations 55 that are adapted to be engaged by a pawl 56 pivotally attached to the rear face of said bracket. Such pawl normally is carried out of such engagement, but as the rack is reciprocated a roller 57 attached to the pawl alternately engages with lugs in the form of flat springs 58 disposed at the proper distance on either side of the transverse median line of the machine, which springs raise the pawl and cause it to engage the rod and move the same forward one notch. Such movement of the rod produces a corresponding transverse movement of the carriage or platform 25 and is arranged to take place following the release of a bar by one of the moving and setting catches and before the other of said catches reaches the end of its travel so that it can be positioned to engage the next bar.

The detailed construction of the keyboard mechanism may be understood by reference to Figs. 13 and 14, the first of said figures showing a typical key lever in several different operative positions. In the scheme illustrated, it is intended that there shall be one key or key lever 60 for each character on the matrix bars, including the blanks on said bars having a predetermined width for spacing purposes. In addition two keys 61, one at each end of the board, are utilized to set bars with merely their thin ends overlapping, as is required for justifying, and, as a matter of fact, provision is made for locating just double the number of matrices on a single bar, by reason of the reverse arrangement of the matrices on the bars belonging to the two groups of oppositely disposed bars. However, a single key can be utilized to locate one character on one bar and another character on another bar, the operator having merely to note from which end of the machine the bar is being moved inwardly in order to select the proper set of characters on the keys.

The keys 60 are mounted in banks, or tiers, on the carriage or platform 25, preferably centrally thereof, as shown in Figs. 1 and 4. Associated with each key, is a transversely reciprocable locking member 62, which said key is adapted to force rearwardly when it is depressed, while the member in turn is adapted thereupon to lock such key in its depressed position. The individual key, shown in Fig. 13, appears in its normal raised position, and the plan view of Fig. 14 corresponds with Fig. 13 in this respect; in Fig. 13$^a$, however, the key lever is shown depressed and the locking member shifted into its rearmost, or operative position. In such depressed position of the key lever 16, its rear end 65 is tilted upwardly into position to engage the lever 31 on the slide 28 as the latter is reciprocated. Similarly the locking member 62 in its rearmost position is adapted to engage a fixed lug or cam 64 that projects forwardly from the slide 28 and lies directly beneath the lever 31. The effect of the engagement of the rear end of the key lever with lever 31 on the slide is to oscillate the forward end of such last named lever in a direction opposite to that in which the slide itself is moving at the time. As a result of such oscillation the catch 27 at the trailing end of the slide will be raised from the position shown at the right in Fig. 10 to that shown at the left of said figure. The effect of the engagement of the locking member 62 with the fixed lug or cam 64 on the slide, is to force said member forwardly into its normal position. Since this return movement of the locking member will be completed before completion of the oscillation of the lever 31 by the rear end of the key-lever, such rear key-lever end is provided with a projection 66 that is adapted to rest on top of the lever 31 until the latter has entirely passed beyond the range of action of the key lever. Thereupon, the member 62, having been restored to its normal position as just described, the key lever will drop back into its normal position.

The locking member 62 carries a leaf spring 63 that projects forwardly and engages a downwardly projecting lug or heel 67 on the key-lever, such heel lying forwardly of the pivotal axis of the key-lever so as to tend to retain the latter in its normal position. This spring has an offset at the point where it thus engages such heel, so that the rearward movement of the locking member may be derived from the action of this heel on the spring. The rear end 65 of the lever is furthermore beveled so as to exert a cam-like action on said locking member to assist in forcing the latter back into operative position. The locking member it should finally be noted, has a raised face 68 which, in such operative position of the member, is located beneath the rear end of the key-lever and thus positively retains the latter in its depressed or operative position. The operator in using the key-board may, accordingly, depress a selected key-lever and then proceed with the selection of the next key-lever, since the first key-lever will be locked, by the means just described, in position to release the matrix bar then in course of movement by virtue of the engagement of a catch 27 on the reciprocating slide 28 with the pin in such bar. Such release, and the restoration of the key-lever and its corresponding locking member, are all accomplished automatically, thus affording ample time to the operator to set another key before the direction of movement on the slide is reversed, incidentally to positioning the next matrix bar.

For effecting the engagement of the catches 27 with the pins at the butt ends of successive bars, various means may be employed; for example, a simple inclined cam face (not shown) may be disposed at each end of the carriage or traveling frame which supports the key-board, with which cam face said catches may engage, as the limit of movement of the slide is reached. Preferably, however, I employ relatively stationary elements in the form of two pins 69 (see Figs. 1 and 4) mounted on the upper face of the carriage or frame, one on each side of the bank of key levers, these pins lying in the path of movement of the lever 31, and their location being so determined that they will engage such lever just before the end of the slide's movement in a corresponding direction is reached. Such pins 69 respectively serve to oscillate the lever 31 so as to drop the catch at the forward end of the slide (having regard to the direction of movement of the latter) and over the pin on the outer-most matrix bar in the adjacent group of bars. It will be observed that the recesses 29 in the catches 27 are of sufficient extent longitudinally to insure engagement of the catch with such pin, even if the depression of the catch is not timed with absolute accuracy. The under sides of the catches are furthermore grooved as shown at 29ᵃ in Fig. 10ᵃ, so that the catch will ride up over the pin, even if it is prematurely dropped.

For forcing together the bars which may be left with their ends merely overlapping, in order that the assembled line of assembled matrices may be justified, as also for re-assembling the distributed body of bars into the two separate groups above described, we provide what may be called driving and re- assembling mechanism. Such mechanism consists of two handled plates 70 supported by traveling carriages 71 on a bar 72 that is pivotally attached or hinged to standards 73 disposed to the rear of the rack 38 and lying parallel therewith and with the trough 7. Normally the bar 72 is tilted into vertical position, as shown in Figs. 1, 2 and 4, in which position the blades likewise are turned up vertically out of the way. The operator, however, may readily seize the handled portions of the blades and turn them down over the bars in the trough, as shown in Fig. 3, assuming the carriage or platform to have been moved forwardly so as to uncover the bars and trough. When the blades are thus turned down they are adapted to engage the pins 30 on those of the bars disposed for use in justifying as aforesaid, and by pushing said blades toward the center, the necessary wedging action is readily produced.

Conversely, after the casting operation, when it is desired to restore the bars to their initial positions, these blades 70 may be brought close up together at the center of the machine and turned down inside the pins of the bars which have been brought forward from their normal positions, even within the pins of those which have been brought farthest forward as shown in dotted outline Fig. 12. By then moving the blade outwardly the pins on all of such distributed bars will be caught up and the bars carried along until their butt ends are brought against the ribs 12 which form the end walls of the trough, thus restoring each group of bars into the normal assembled condition in which the majority of them are shown in Fig. 2.

Obviously there will be more or less of a tendency present for the bars that have been located in selected positions by the joint action of the reciprocating catches 27 and the keyboard mechanism, to be displaced from such positions by the successive movement of adjacent bars, and it accordingly becomes desirable to provide means for retaining the bars in such positions. To this end a member is provided similar in its action to the comb-like composer frame of the "Ludlow" typograph, said member consisting of a bar 75 supported from the rear of the carriage or platform 25 and in parallel relation thereto, sufficient space being left between the same and the platform proper to accommodate said catches 27 and their supporting and actuating mechanism. Bar 75 is provided on its under side with a series of transverse grooves 76 corresponding in their spacing with that of the matrices on the matrix bars. Such grooves are adapted to engage with the pins 30 on the successive matrix bars, immediately after such bars are located and incidentally to the forward shifting movement imparted to the carriage as heretofore described. The width of the bar, that is the length of the grooves need be sufficient only to accommodate a limited number of the bars, since it has been found that if the first couple bars are held against shifting the locating of successive bars will not disturb the distributed body of bars in the rear portion of the trough.

For finally alining the matrices that are assembled or located over the casting slot, it being requisite that such alinement be performed with care, we utilize a spline 78 that is adapted to enter into the slots 11 which it has been explained are cut in the upper edges of the bars. This spline is formed on the under side of a slide 79 transversely mounted in the bed of the machine just back of the trough in which the matrix bars are supported, such slide being alined with the casting slot in the bottom of the trough, so that, when the slide is brought forward, it will enter the alined series of slots in the distributed bars which are located over such slot as shown in Figs. 9 and 12.

Slide 79 carrying the spline 78 is adapted to be thus actuated forwardly to aline the bars by means of a lever 80 which is pivotally mounted on an axis 81 at right angles to this slide and connected by a series of gears 82 with a pinion 83 that meshes with a rack 84 on the slide. Accordingly, when the lever is depressed from the position shown for example in Fig. 3, the slide and spline will be simultaneously advanced.

Lever 80 also carries means for pressing the spline 78 after it is thus advanced, forcibly against the bars and for locking the parts in such position. The means in question comprise a latch 85 pivotally attached to the upper face of the lever whereby the latter may be held either in the elevated position shown in Fig. 3 by engagement with a notch 86 in the supporting standard of the lever, or in its lower depressed position by engagement with a second notch 87 in said standard. A spring 88 tends to force the latch into engagement with whichever notch is adjacent the end of the latter. Pivoted to the lever 80 near its outer end is a member 89 that is formed with a foot of the form clearly shown in Fig. 4, such foot being disposed to engage or straddle the splined portion of the slide 79 in the advanced position of the latter, as shown in Fig. 9. Arranged to coact with the forward end of this member is a handled cam-member 90 that, when depressed as shown in said Fig. 4, will force the presser foot of member 89 down with increased pressure, the reaction of course being taken by the latch 85 which locks the lever against movement about its axis 81. This same cam-member 90 upon being thrown back (to the left in Fig. 3) will engage the forward end of latch 85, and actuate said latch to release its rear end from whichever notch (86 or 87) it may chance to engage. A spring 91 tends to hold member 89 against cam-member 90.

Since it will be desirable to arrange for the reciprocation of the rack 38 and slide 28, through which the shifting of the successive matrix bars is effected in the operation of distributing the bars to compose a line, as rapidly as an operator can manipulate the keys of the keyboard to disengage and thus locate successive bars, such slide may have to reciprocate at a fairly rapid rate. The momentum thus imparted to the successive bars as they are picked up by the catches and carried inwardly across the casting slot may be such as to carry the pins thereon past the appropriate grooves 76 in the composer plate 75, which as above described, has as its function to preliminarily determine the position of the distributed bars. Means are accordingly provided to instantly arrest the movement of a bar, upon its pin being disengaged by the shifting mechanism. Such means in the present illustrated form of the machine comprise a series of serrated bars 95 extending continuously along the rear edge of the carriage or platform 25 so as to lie just above the upper edges of the bars and in front of the portion of the slide 28 to which the catches 27 and the members for actuating the same are attached. The serrated bars 95 overlap terminally so as to present a continuous series of notches or serrations, but said bars are individually pressed outwardly by the action of compression springs 96 on plungers 97, which latter are pivotally attached to said bars as shown in detail in Figs. 6 and 7.

As the slide 28 moves back and forth, it serves to press these serrated bars back out of the way, but as fast as they are uncovered following the passage of the slide they are urged forward by their springs into position to engage the pin on the adjacent bar. The result, in other words, is that when either catch is raised to release a pin engaged thereby, such pin is instantly caught in a notch in the adjacent serrated bar. Thus, not only is any tendency of the bar to keep on moving by reason of its acquired momentum prevented, but the pin is held and forced into the appropriate groove 76 in the composer bar 75 as the latter moves forward with the carriage.

The general mode of operation of our improved typograph mechanism should be evident from the foregoing description of its several component parts, since the operation of each of these has been indicated incidentally to setting forth the structural features of such part. Such general operation may nevertheless be briefly reviewed to advantage.

Initially to arranging, or composing, a line of matrices for casting a type-bar or slug, the two groups of bars which compose the entire body used in the machine will be collected in the respective ends of the trough in the condition in which the majority of such bars are shown in Fig. 2. The driving mechanism for reciprocating the rack is then connected by throwing in the clutch 48, and as a result the slide 28 on the carriage or platform will have imparted to it a corresponding reciprocating movement. It will be understood that such carriage or platform at the start-off is located in its extreme rear position as shown in Figs. 1 and 3, and that the block 13 in the front wall of the trough is likewise in its extreme rear position in which it is substantially shown in Fig. 2; also that the spline-slide 79 is retracted and the lever 80 raised. As the slide 28 reaches its limit of movement, say to the right of the machine as shown in Fig. 1, the corresponding catch 27 will engage the pin 30 of the bar next to the rear wall of the trough in the group of bars at that end of the trough. The movement of the slide now being reversed, the bar thus engaged will be carried to the left until the catch is thrown out of engagement with such matrix-bar pin by the rear end of one or the other of the keys 60, the operator having in the meantime depressed the key 60 corresponding with the first character which is desired in the line being composed. At the same time that the matrix-bar is thus released in selected position, the key 60 is restored to its normal position by the action of the cam 64 on the corresponding locking member 62. The movement of the slide 28 to the left continues until the end of such movement is reached, whereupon the first bar of the group at the left of the trough is engaged and carried forward over the casting slot upon the movement of the slide being reversed. This bar is also left in selected position by the action of a key-actuated plunger, and so the operation is continued, a bar being located incidentally to each reciprocation of the slide by depressing an appropriate key.

Where it is desired to leave an adjustable blank space in the line being composed, one, or preferably both keys 61 will be struck and thus two successive matrix bars will be moved only a short distance from their normal positions so that their pointed ends will extend across the casting slot (and overlap in the case of two bars being used). The space is then subsequently justified by forcing such bars inwardly with the handled blades 70. If, however, a predetermined space is desired a bar is located with one of the blank spaces further along on its under edge definitely in place over the casting slot by depressing the proper key 60.

When a line has been entirely composed, the carriage will be drawn forwardly so as to uncover the distributed body of bars, and thereupon the lever 80 depressed, simultaneously advancing the spline 78 into engagement with the slots 11 in the matrix-bars located immediately over the casting slot. With the lever latched in its depressed position, a turn of the handled cam 90 will force the presser foot 89 against the spline-slide 79, thus locking the bars securely in place. At the same time by actuating the lever 18 at the front of the machine, the block 13 is forced in to compress the bars laterally. The type-bar or slug is then cast by forcing metal from the pot into the slot in the mold, as need not be further described. The next step is to release the body of matrix-bars, clamped in the fashion just described, by withdrawing the block 13 a trifle and unlatching and raising the lever 80. The handled blades 70 are then utilized in sweeping the respective groups of bars back into normal collected condition in the respective ends of the trough, whereupon the machine is ready for operation to cast another type-bar or slug.

From the foregoing description it will be obvious that all the advantages inherent in the use of a loose body of matrix bars independently shiftable for the purpose of composition and justification as in the "Ludlow" typograph, are retained in the present improved machine. At the same time the actual manual handling of the bars is eliminated, this being mechanically effected, and all the operator needs to do is to control such handling by means of the keyboard. There are no complicated parts to get out of order, and every portion of the mechanism is readily accessible for inspection and adjustment. The arrangement of the bars in fact presents a decided improvement in itself over the "Ludlow" typograph as at present on the market, for by collecting the undistributed bars in two separate groups instead of a single group, as heretofore, we avoid the necessity of shifting such entire body of bars, an improvement that is of equal importance irrespective of whether the power shifting and keyboard locating means be used or not.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In mechanism of the character described, the combination with a suitable support provided with type-bar casting mechanism; of two sets of matrix bars individually movable on said support into varied operative relation to said casting means, the bars of one set bearing series of matrices similar to those of the other set but in reverse order and such sets of bars being normally collected into groups entirely separate from each other.

2. In mechanism of the character described, the combination with a suitable support provided with type-bar casting mechanism; of two sets of laterally tapered matrix-bars individually movable on said support into varied operative relation to said casting means, the bars of one set bearing series of matrices similar to those of the other set but in reverse order and such sets of bars being normally collected into groups entirely separate from each other with the thin ends of the bars directed toward each other.

3. In mechanism of the character described, the combination with a suitable support provided with transversely disposed type-bar casting means; of two sets of matrix-bars individually movable on said support into varied operative relation to said casting means, the bars of one set bearing series of matrices similar to those of the other set but in reverse order and such sets of bars being normally collected into entirely separate groups respectively lying on opposite sides of said casting means.

4. In mechanism of the character described, the combination with a suitable support provided with transversely disposed type-bar casting means; of two sets of laterally tapered matrix-bars individually movable on said support into varied operative relation to said casting, the bars of one set bearing series of matrices similar to those of the other set but in reverse order and such sets of bars being normally collected into entirely separate groups respectively lying on opposite sides of, and with the thin ends of the bars directed toward, said casting means.

5. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, such matrices terminating short of the thin ends of the bars whereby such ends are left blank, and such sets of bars being normally collected into two entirely separate groups respectively lying on opposite sides of, and with the thin ends of the bars directed toward, said casting means.

6. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, such matrices terminating short of the thin ends of the bars whereby such ends are left blank, and such sets of bars being normally collected into two entirely separate groups respectively lying on opposite sides of, and with the thin ends of the bars directed toward, said casting means; and means for forcing together bars with their thin ends overlapping, whereby a line of assembled matrices may be justified.

7. In mechanism of the character described, the combination with a suitable support provided with transversely disposed type-bar casting means; of two sets of matrix-bars individually movable on said support into varied operative relation to said casting means, the bars of one set bearing series of matrices similar to those of the other set but in reverse order and such sets of bars being normally collected into separate groups on opposite sides of said casting means; and a movable abutment adjacent to said casting means, said bars being adapted to force said abutment back as they are moved into operative relation to said casting means.

8. In mechanism of the character described, the combination with a suitable support provided with transversely disposed type-bar casting means; of two sets of matrix-bars individually movable on said support into varied operative relation to said casting means, the bars of one set bearing series of matrices similar to those of the other set but in reverse order and such sets of bars being normally collected into separate groups on opposite sides of said casting means; a fixed abutment on one side, and a movable abutment on the other side, of said casting means, said bars being adapted to force said movable abutment back as they are moved into operative relation to said casting means.

9. In mechanism of the character described, the combination with a suitable support provided with transversely disposed type-bar casting means; of two sets of matrix-bars individually movable on said support into varied operative relation to said casting means, the bars of one set bearing series of matrices similar to those of the other set but in reverse order and such sets of bars being normally collected into separate groups on opposite sides of said casting means; a movable abutment adjacent to said casting means, said bars being adapted to force said abutment back as they are moved into operative relation to said casting means; and a stop adapted to limit such movement of said abutment.

10. In mechanism of the character described, the combination with a suitable support provided with transversely disposed type-bar casting means; of two sets of matrix-bars individually movable on said support into varied operative relation to said casting means, the bars of one set bearing series of matrices similar to those of the other set but in reverse order and such sets of bars being normally collected into separate groups on opposite sides of said casting means; a movable abutment adjacent to said casting means, said bars being adapted to force said abutment back as they are moved into operative relation to said casting means; and a removable stop adapted to limit such movement of said abutment.

11. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, such matrices terminating short of the thin ends of the bars whereby such ends are left blank, and such sets of bars being normally collected into two groups on opposite sides of, and with the thin ends of the bars directed toward, said casting means; a movable abutment adjacent to said casting means, said bars being adapted to force said abutment back as they are moved into operative relation to said casting means; and means for forcing together bars with their thin ends overlapping, whereby a line of assembled matrices may be justified.

12. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, such matrices terminating short of the thin ends of the bars whereby such ends are left blank, and such sets of bars being normally collected into two groups on opposite sides of, and with the thin ends of the bars directed toward, said casting means; a movable abutment adjacent to said casting means, said bars being adapted to force said abutment back as they are moved into operative relation to said casting means; a stop adapted to limit such movement of said abutment; and means for forcing together bars with their thin ends overlapping, whereby a line of assembled matrices may be justified.

13. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, such matrices terminating short of the thin ends of the bars whereby such ends are left blank, and such sets of bars being normally collected into two groups on opposite sides of, and with the thin ends of the bars directed toward, said casting means; a fixed abutment on one side, and a movable abutment on the other side, of said casting means, said bars being adapted to force said movable abutment back as they are moved into operative relation to said casting means.

14. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, such matrices terminating short of the thin ends of the bars whereby such ends are left blank, and such sets of bars being normally collected into separate groups on opposite sides of, and with the thin ends of the bars directed toward, said casting means; a fixed abutment on one side, and a movable abutment on the other side, of said casting means, said bars being adapted to force said movable abutment back as they are moved into operative relation to said casting means; and means for forcing together bars with their thin ends overlapping, whereby a line of assembled matrices may be justified.

15. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order and such sets of bars being normally collected into separate groups on opposite sides of, and with the thin ends of the bars directed toward, said casting means; and a movable abutment adjacent to said casting means, said abutment having oppositely inclined faces adapted to engage and guide the thin ends of the bars of such groups, respectively, as said bars are moved into operative position, said bars being adapted to force said abutment back as they are thus moved.

16. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order and such sets of bars being normally collected into separate groups on opposite sides of, and with the thin ends of the bars directed toward, said casting means; a fixed abutment on one side, and a movable abutment on the other side, of said casting means, said movable abutment having oppositely inclined faces adapted to engage and guide the thin ends of the bars of such groups, respectively, as said bars are moved into operative position, said bars being adapted to force said abutment back as they are thus moved.

17. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order and such sets of bars being normally collected into separate groups on opposite sides of, and with the thin ends of the bars directed toward, said casting means; a fixed abutment on one side, and a movable abutment on the other side, of said casting means, said movable abutment having oppositely inclined faces adapted to engage and guide the thin ends of the bars of such groups, respectively, as said bars are moved into operative position, said bars being adapted to force said abutment back as they are thus moved; and means tending to press such groups of bars bodily against said fixed abutment.

18. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order and such sets of bars being normally collected into separate groups on opposite sides of, and with the thin ends of the bars directed toward, said casting means; a fixed abutment on one side, and a movable abutment on the other side, of said casting means, said movable abutment having oppositely inclined faces adapted to engage and guide the thin ends of the bars of such groups, respectively, as said bars are moved into operative position, said bars being adapted to force said abutment back as they are thus moved; and resilient means tending to press such groups of bars bodily against said fixed abutment.

19. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order and such sets of bars being normally collected into separate groups on opposite sides of, and with the thin ends of the bars directed toward, said casting means; a fixed abutment on one side, and a movable abutment on the other side, of said casting means, said movable abutment having oppositely inclined faces adapted to engage and guide the thin ends of the bars of such groups, respectively, as said bars are moved into operative position, said bars being adapted to force said abutment back as they are thus moved; a bar disposed in front of each such group of matrix-bars and slidably resting at its inner end against the adjacent inclined face of said movable abutment; and resilient pressing means connected with the outer end of each of said bars.

20. In mechanism of the character described, the combination with a suitable support provided with type-bar casting means; of a set of matrix-bars individually movable on said support into varied operative relation to said casting means; automatically operating means adapted successively to engage and thus to move individual bars; and manually operable means adapted to limit the amount of such movement as desired.

21. In mechanism of the character described, the combination with a suitable support provided with type-bar casting means; of a set of matrix-bars individually movable on said support into varied operative relation to said casting means; automatically operating means adapted successively to engage and thus to move individual bars; and key-board mechanism adapted to limit the amount of such movement as desired.

22. In mechanism of the character described, the combination with a suitable support provided with type-bar casting means; of two sets of matrix-bars individually movable on said support into varied operative relation to said casting means, the bars of one set bearing series of matrices similar to those of the other set but in reverse order and such sets of bars being normally collected into separate groups; automatically operating means adapted to engage and thus to move successive bars first of one such group, then the other; and manually operable means adapted to limit the amount of such movement as desired.

23. In mechanism of the character described, the combination with a suitable support provided with type-bar casting means; of two sets of matrix-bars individually movable on said support into varied operative relation to said casting means, the bars of one set bearing series of matrices similar to those of the other set but in reverse order and such sets of bars being normally collected into separate groups; automatically operating means adapted to engage and thus to move successive bars first of one such group, then the other; and key-board mechanism adapted to limit the amount of such movement as described.

24. In mechanism of the character described, the combination with a suitable support provided with type-bar casting means; of two sets of matrix-bars individually movable on said support into varied operative relation to said casting means, the bars of one set bearing series of matrices similar to those of the other set but in reverse order and such sets of bars being normally collected into separate groups; automatically operating means adapted to engage and thus to move successive bars first of one such group, then the other; and key-board mechanism adapted to limit the amount of such movement as desired, said mechanism including as many keys as there are characters on such matrix-bars, each key serving for two characters from bars belonging to such two groups, respectively.

25. In mechanism of the character described, the combination with a suitable support provided with type-bar casting mechanism; of two sets of laterally tapered matrix-bars individually movable on said support into varied operative relation to said casting means, the bars of one set bearing series of matrices similar to those of the other set but in reverse order and such sets of bars being normally collected into separate groups with the thin ends of the bars directed toward each other; automatically operating means adapted to engage and thus to move successive bars first of one such group, then the other; and manually operable means adapted to limit the amount of such movement as desired.

26. In mechanism of the character described, the combination with a suitable support provided with type-bar casting mechanism; of two sets of laterally tapered matrix-bars individually movable on said support into varied operative relation to said casting means, the bars of one set bearing series of matrices similar to those of the other set but in reverse order and such sets of bars being normally collected into separate groups with the thin ends of the bars directed toward each other; automatically operating means adapted to engage and thus to move successive bars first of one such group, then the other; and key-board mechanism adapted to limit the amount of such movement as desired.

27. In mechanism of the character described, the combination with a suitable support provided with type-bar casting mechanism; of two sets of laterally tapered matrix-bars individually movable on said support into varied operative relation to said casting means, the bars of one set bearing series of matrices similar to those of the other set but in reverse order and such sets of bars being normally collected into separate groups with the thin ends of the bars directed toward each other; automatically operating means adapted to engage and thus to move successive bars first of one such group, then the other; and key-board mechanism adapted to limit the amount of such movement as desired, said mechanism including as many keys as there are characters on such matrix-bars, each key serving for two characters from bars belonging to such two groups, respectively.

28. In mechanism of the character described, the combination with a suitable support provided with type-bar casting mechanism; of two sets of laterally tapered matrix-bars individually movable on said support into varied operative relation to said casting means, the bars of one set bearing series of matrices similar to those of the other set but in reverse order and such sets of bars being normally collected into separate groups with the thin ends of the bars directed toward each other; continuously reciprocating means adapted to engage a bar first of one such group, then the other, and move the same across said casting means; and manually operable means adapted to disengage said reciprocating means from a bar when the latter is locked in selected position.

29. In mechanism of the character described, the combination with a suitable support provided with type-bar casting mechanism; of two sets of laterally tapered matrix-bars individually movable on said support into varied operative relation to said casting means, the bars of one set bearing series of matrices similar to those of the other set but in reverse order and such sets of bars being normally collected into separate groups with the thin ends of the bars directed toward each other; bar-engaging means having a continuous reciprocating movement parallel with said matrix-bars and an intermittent movement transversely thereof, whereby said means are adapted to engage a bar first of one such group, then the other, and move the same across said casting means; and manually operable means adapted to disengage said reciprocating means from a bar when the latter is located in selected position.

30. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame movable transversely of said matrix-bars; and means supported on said frame so as to be movable longitudinally of said bars and adapted to engage the latter, one at a time, and move the same from normal position.

31. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame movable transversely of said matrix-bars; means supported on said frame so as to be reciprocable longitudinally of said bars and adapted to engage the latter, one at a time; and other, manually operable means carried by said frame and adapted to disengage aforesaid bar-engaging means from a bar, so as to leave the latter in selected position.

32. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame movable transversely of said matrix-bars; means supported on said frame so as to be reciprocable longitudinally of said bars and adapted to engage the latter, one at a time; and key-board mechanism carried by said frame and adapted to disengage said bar-engaging means from a bar, so as to leave the latter in selected position.

33. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame movable transversely of said matrix-bars; means supported on said frame so as to be reciprocable longitudinally of said bars and adapted to engage the latter, one at a time; means adapted to reciprocate said bar-engaging means; and keyboard mechanism carried by said frame and adapted to disengage said bar-engaging means from a bar, so as to leave the latter in selected position.

34. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame movable transversely of said matrix-bars; means supported on said frame so as to be reciprocable longitudinally of said bars and adapted to engage the latter, one at a time; means adapted to intermittently shift said frame transversely of said bars; other means adapted to reciprocate said bar-engaging means irrespective of the position of said frame; and key-board mechanism carried by said frame and adapted to disengage said bar-engaging means from a bar, so as to leave the same in selected position.

35. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separated groups on opposite sides of, and with their thin ends directed toward, said casting means; a frame movable transversely of said matrix-bars; means supported on said frame so as to be reciprocable longitudinally of said bars and adapted to engage the latter, one at a time; means adapted to intermittently shift said frame transversely of said bars; other means adapted to reciprocate said bar-engaging means irrespective of the position of said frame, said shifting means advancing said frame one step incidentally to each movement of said reciprocating means; and key-board mechanism carried by said frame and adapted to disengage said bar-engaging means from a bar, so as to leave the same in selected position.

36. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame movable transversely of said matrix-bars; a slide reciprocably mounted on said frame so as to be movable longitudinally of said bars; and a pair of catches carried by said slide and adapted to engage bars in such two groups, respectively, and move the same.

37. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame movable transversely of said matrix-bars; a slide reciprocably mounted on said frame so as to be movable longitudinally of said bars; a pair of catches carried by said slide and adapted to engage bars in such two groups, respectively, and move the same; and manually operable means carried by said frame and adapted to disengage either of said catches from a bar, so as to leave the latter in selected position.

38. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame movable transversely of said matrix-bars; a slide reciprocably mounted on said frame so as to be movable longitudinally of said bars; a pair of catches carried by said slide and adapted to engage bars in such two groups, respectively, and move the same; and key-board mechanism carried by said frame and adapted to disengage either of said catches from a bar, so as to leave the latter in selected position.

39. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame movable transversely of said matrix-bars; a slide reciprocably mounted on said frame so as to be movable longitudinally of said bars; a pair of catches carried by said slide and adapted to engage bars in such two groups, respectively, and move the same; means adapted to be detachably connected with said slide for reciprocating the same, and other means adapted to intermittently shift said frame, whereby said catches are enabled to engage successive bars in such groups, alternately; and key-board mechanism carried by said frame and adapted to disengage either of said catches from a bar, so as to leave the latter in selected position.

40. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame movable transversely of said matrix-bars; a slide reciprocably mounted on said frame so as to be movable longitudinally of said bars; a pair of catches carried by said slide and adapted to engage bars in such two groups, respectively, and move the same; a reciprocable rack on said support; means for detachably connecting said rack with said slide, and other means, operating in unison with the movements of said rack, adapted to intermittently shift said frame, whereby said catches are enabled to engage successive bars in such groups, alternately; and keyboard mechanism carried by said frame and adapted to disengage either of said catches from a bar, so as to leave the latter in selected position.

41. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame movable transversely of said matrix-bars; a slide reciprocably mounted on said frame so as to be movable longitudinally of said bars; a pair of catches carried by said slide and adapted to engage bars in such two groups, respectively, and move the same; an oscillatory lever on said slide adapted to operate said catches; and key-board mechanism carried by said frame, said mechanism including key-levers movable into the path of said oscillatory lever, whereby the latter may be actuated so as to leave a bar in selected position.

42. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame movable transversely of said matrix-bars; a slide reciprocably mounted on said frame so as to be movable longitudinally of said bars; a pair of catches carried by said slide and adapted to engage bars in such two groups, respectively, and move the same; an oscillatory lever on said slide adapted to operate said catches; and key-board mechanism carried by said frame, said mechanism including key-levers movable into the path of said oscillatory lever, whereby the latter may be actuated so as to leave a bar in selected position; and a lug on said slide adapted to restore such key lever to its initial position after thus actuating said oscillatory lever.

43. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into entirely separate groups respectively lying on opposite sides of, and with their thin ends directed toward, said casting means; means adapted to locate successive bars, from such groups alternately, in selected position; and means adapted to hold said bars when thus located.

44. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into entirely separate groups respectively lying on opposite sides of, and with their thin ends directed toward, said casting means; means adapted to locate successive bars, from such groups alternately, in selected position; and means adapted to hold said bars when thus located, said holding means including a member movable transversely of said matrix-bars and adapted to engage with said bars in their selected positions.

45. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; means adapted to locate successive bars, from such groups alternately, in selected position; and means adapted to hold said bars when thus located, said holding means including pins on said matrix-bars, respectively, and a bar movable transversely across said matrix-bars and provided with a series of grooves adapted to engage with such pins in the selected positions of said matrix-bars.

46. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; means adapted to locate successive bars, from such groups alternately, in selected position; means adapted to hold said bars when thus located, said holding means including a bar movable transversely of said matrix-bars and adapted to engage with said bars in their selected positions; and means adapted to intermittently shift said holding bar thus transversely of said matrix-bars.

47. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; means adapted to locate successive bars, from such groups alternately, in selected position; means adapted to hold said bars when thus located, said holding means including pins on said matrix-bars, respectively, and a bar movable transversely across said matrix-bars and provided with a series of grooves adapted to engage with such pins in the selected positions of said matrix-bars; and means adapted to intermittently shift said holding bar thus transversely of said matrix-bars.

48. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame shiftable transversely of said matrix-bars; means supported on said frame so as to be movable longitudinally of said bars and adapted to engage the latter, one at a time, and move the same into selected position; and means adapted to hold said bars when thus located.

49. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame shiftable transversely of said matrix-bars; means supported in said frame so as to be movable longitudinally of said bars and adapted to engage the latter, one at a time, and move the same into selected position; and means adapted to hold said bars when thus located, said holding means including a member attached to and movable with said frame so as to engage with said bars as said frame is shifted.

50. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame shiftable transversely of said matrix-bars; means supported in said frame so as to be movable longitudinally of said bars and adapted to engage the latter, one at a time, and move the same into selected position; and means adapted to hold said bars when thus located, said holding means including pins on said matrix-bars, respectively, and a bar attached to and movable with said frame and provided with a series of grooves adapted to engage with such pins in the selected positions of said matrix-bars.

51. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame shiftable transversely of said matrix-bars; means supported in said frame so as to be movable longitudinally of said bars and adapted to engage the latter, one at a time, and move the same into selected position; means adapted to hold said bars when thus located; and means adapted to intermittently shift said frame.

52. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame shiftable transversely of said matrix-bars; means supported in said frame so as to be movable longitudinally of said bars and adapted to engage the latter, one at a time, and move the same into selected position; means adapted to hold said bars when thus located, said holding means including a member attached to and movable with said frame so as to engage with said bars as said frame is shifted; and means adapted to intermittently shift said frame and attached bar.

53. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups on opposite sides of, and with their thin ends directed toward, said casting means; a frame shiftable transversely of said matrix-bars; means supported on said frame so as to be movable longitudinally of said bars and adapted to engage the latter, one at a time, and move the same into selected position; means adapted to hold said bars when thus located, said holding means including pins on said matrix-bars, respectively, and a bar attached to and movable with said frame and provided with a series of grooves adapted to engage with such pins in the selected positions of said matrix-bars; and means adapted to intermittently shift said frame and attached bar.

54. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, such sets of bars being normally collected into entirely separate groups respectively located on opposite sides of, and with their thin ends directed toward, said casting means; means adapted to locate successive bars, from such groups alternately, in selected position; means adapted to hold said bars when thus located; and other means tending to force a located matrix-bar into engagement with said holding means.

55. In mechanism of the character described, the combination with a suitable support provided with transversely disposed type-bar casting means; of two sets of laterally tapered matrix-bars individually movable on said support into varied operative relation to said casting means, the bars of one set bearing series of matrices similar to those of the other set but in reverse order, and such sets of bars being normally collected into entirely separate groups respectively located on opposite sides of, and with their thin ends directed toward, said casting means; means adapted to locate successive bars, from such groups alternately, in selected position; a member movable transversely across said matrix-bars so as to engage and hold the same when thus located; and other means adapted to press laterally against a located matrix-bar to force the same into engagement with said member.

56. In mechanism of the character described, the combination with a suitable support provided with type-bar casting means; of a set of matrix-bars individually movable on said support into varied operative relation to said casting means; automatically operating means adapted to engage and release and thus to locate successive bars; and other means adapted to arrest the movement of a bar when released from said locating means.

57. In mechanism of the character described, the combination with a suitable support provided with type-bar casting means; of a set of matrix-bars individually movable on said support into varied operative relation to said casting means; automatically operating means adapted successively to engage and release and thus to locate individual bars; and other means tending to force a bar laterally when released from said locating means.

58. In mechanism of the character described, the combination with a suitable support provided with type-bar casting means; of a set of matrix-bars individually movable on said support into varied operative relation to said casting means; automatically operating means adapted successively to engage and release and thus to move successive bars; manually operable means adapted to limit the amount of such movement; and means adapted to arrest the movement of a bar when released from said locating means.

59. In mechanism of the character described, the combination with a suitable support provided with type-bar casting means; of a set of matrix-bars individually movable on said support into varied operative relation to said casting means; automatically operating means adapted successively to engage and release and thus to move individual bars; key-board mechanism adapted to limit the amount of such movement as desired; and means tending to force a bar laterally when released from said locating means.

60. In mechanism of the character described, the combination with type-bar casting means; of a suitable support; a set of matrix-bars individually movable on said support into varied operative relation to said casting means; a frame movable transversely of said matrix-bars; means supported by said frame so as to be movable longitudinally of said bars and adapted to engage the latter, one at a time, move such bar into selected position and there release the same; and other means carried by said frame and adapted to arrest the movement of a bar when released from said engaging means.

61. In mechanism of the character described, the combination with type-bar casting means; of a suitable support; a set of matrix-bars individually movable on said support into varied operative relation to said casting means; a frame movable transversely of said matrix-bars; means supported by said frame so as to be movable longitudinally of said bars and adapted to engage the latter, one at a time, move such bar into selected position and there release the same; and other means carried by said frame and tending to force a bar laterally when released from said engaging means.

62. In mechanism of the character described, the combination with type-bar casting means; of a suitable support; a set of matrix-bars individually movable on said support into varied operative relation to said casting means; a frame movable transversely of said matrix-bars; means supported by said frame so as to be movable longitudinally of said bars and adapted to engage the latter, one at a time, move such bar into selected position and there release the same; means carried by said frame and tending to force a bar laterally when released from said engaging means; and other means adapted to hold said bars when thus released.

63. In mechanism of the character described, the combination with type-bar casting means; of a suitable support; a set of matrix-bars individually movable on said support into varied operative relation to said casting means; a frame movable transversely of said matrix-bars; means supported by said frame so as to be movable longitudinally of said bars and adapted to engage the latter, one at a time, move such bar into selected position and there release the same; means carried by said frame and tending to force a bar laterally when released from said engaging means; and other means adapted to hold said bars when thus released; said last-named means including a member attached to and movable with said frame so as to engage with said bars as said frame is shifted.

64. In mechanism of the character described, the combination with type-bar casting means; of a suitable support; a set of matrix-bars individually movable on said support into varied operative relation to said casting means; a frame movable transversely of said matrix-bars; means supported on said frame so as to be reciprocable longitudinally of said bars and adapted to engage the latter, one at a time; manually operable means carried by said frame and adapted to release a bar from aforesaid bar-engaging means, so as to locate such bar in selected position; a member attached to and movable with said frame, said member being adapted to engage with said bars when released from said bar-engaging means; and other means tending to force a bar into engagement with said member when thus released from said bar-engaging means.

65. In mechanism of the character described, the combination with type-bar casting means; of a suitable support; a set of matrix-bars individually movable on said support into varied operative relation to said casting means; a frame movable transversely of said matrix-bars; means supported on said frame so as to be reciprocable longitudinally of said bars and adapted to engage the latter, one at a time; manually operable means carried by said frame and adapted to release a bar from aforesaid bar-engaging means, so as to locate such bar in selected position; a member attached to and movable with said frame, said member being adapted to engage with said bars when released from said bar-engaging means; and other resilient means adapted to press laterally against a bar to force the same into engagement with said member when thus released from said bar-engaging means.

66. In mechanism of the character described, the combination with type-bar casting means; of a suitable support; a set of matrix-bars individually movable on said support into varied operative relation to said casting means, said bars being provided with projecting pins; a frame movable transversely of said matrix-bars; means supported by said frame so as to be movable longitudinally of said bars and adapted to engage the pins on successive bars and move the latter into selected position; a member attached to and movable with said frame and provided with a series of grooves adapted to engage with the pins on said bars in the selected positions of the latter; and means adapted to press laterally against such pins to force the same into engagement with said member.

67. In mechanism of the character described, the combination with type-bar casting means; of a suitable support; a set of matrix-bars individually movable on said support into varied operative relation to said casting means, said bars being provided with projecting pins; a frame movable transversely of said matrix-bars; means supported by said frame so as to be reciprocable longitudinally of said bars and adapted to engage the latter, one at a time; manually operable means carried by said frame and adapted to release a bar from aforesaid pin-engaging means, so as to locate such bar in selected position; a member attached to and movable with said frame and provided with a series of grooves adapted to engage with the pins on said bars in the selected positions of the latter; and resilient means carried by said frame and adapted to press laterally against such pins to force the same into engagement with said member.

68. In mechanism of the character described, the combination with type-bar casting means; of a suitable support; a set of matrix-bars individually movable on said support into varied operative relation to said casting means, said bars being provided with projecting pins; a frame movable transversely of said matrix-bars; means supported by said frame so as to be reciprocable longitudinally of said bars and adapted to engage the latter, one at a time; manually operable means carried by said frame and adapted to release a bar from aforesaid pin-engaging means, so as to locate such bar in selected position; a member attached to and movable with said frame and provided with a series of grooves adapted to engage with the pins on said bars in the selected positions of the latter; a serrated bar supported on said frame adjacent to the path of travel of the pins on successive bars as the latter are located; and a spring tending to press said serrated bar against such a pin when released from aforesaid pin-engaging means and force the same into engagement with a groove on said member.

69. In mechanism of the character described, the combination with type-bar casting means; of a suitable support; a set of matrix-bars individually movable on said support into varied operative relation to said casting means, said bars being provided with projecting pins; a frame movable transversely of said matrix-bars; means supported by said frame so as to be reciprocable longitudinally of said bars and adapted to engage the latter, one at a time; manually operable means carried by said frame and adapted to release a bar from aforesaid pin-engaging means, so as to locate such bar in selected position; a member attached to and movable with said frame and provided with a series of grooves adapted to engage with the pins on said bars in the selected positions of the latter; a series of serrated bars supported on said frame adjacent to the path of travel of the pins on successive bars as the latter are located; and springs tending to press said serrated bars against such a pin when released from aforesaid pin-engaging means, thereby arresting the movement of the corresponding matrix-bar and forcing its pin into engagement with a groove on said member.

70. In mechanism of the character described, the combination with type-bar casting means; of a suitable support; a set of matrix-bars individually movable on said support into varied operative relation to said casting means, said bars being provided with projecting pins; a frame movable transversely of said matrix-bars; means supported by said frame so as to be reciprocable longitudinally of said bars and adapted to engage the latter, one at a time; manually operable means carried by said frame and adapted to release a bar from aforesaid pin-engaging means, so as to locate such bar in selected position; a member attached to and movable with said frame and provided with a series of grooves adapted to engage with the pins on said bars in the selected positions of the latter; a series of spring-pressed plungers mounted on said frame adjacent to, and disposed transversely of, the path of travel of the pins on successive bars as the latter are located; and a series of serrated bars respectively oscillatory on said plungers and adapted to press against such a pin when released from aforesaid pin-engaging means, thereby arresting the movement of the corresponding matrix-bar and forcing its pin into engagement with a groove on said member.

71. In a typograph machine, the combination with matrix-bars; of shifting mechanism therefor, including a slide reciprocable longitudinally of said bars, means carried by said slide adapted to engage an individual bar, a second reciprocable slide parallel with said first slide, power means for reciprocating said second slide, and means adapted to optionally connect said slides together.

72. In a typograph machine, the combination with matrix-bars; of shifting mechanism therefor, including a slide reciprocable longitudinally of said bars, means carried by said slide adapted to engage an individual bar, a second reciprocable slide parallel with said first slide, power means for reciprocating said second slide, and means adapted to optionally connect said slides together, said connecting means comprising a rod reciprocably mounted on said second slide, means adapted to connect one end of said rod to said first slide, and other means adapted to longitudinally shift said rod incidentally to each reciprocation of said second slide.

73. In a typograph machine, the combination with matrix-bars; of shifting mechanism therefor, including a slide reciprocable longitudinally of said bars, means carried by said slide adapted to engage an individual bar, a second reciprocable slide parallel with said first slide, power means for reciprocating said second slide, and means adapted to optionally connect said slides together, said connecting means comprising a rod reciprocably mounted on said second slide, means adapted to connect one end of said rod to said first slide, and pawl-and-ratchet means adapted to longitudinally shift said rod incidentally to each reciprocation of said second slide.

74. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, and means adapted to engage and oscillate said lever incidentally to reciprocation of said slide.

75. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, and a relatively stationary element adapted to engage said lever and oscillate the same to effect the engagement of said catch with a bar in a predetermined position of said slide.

76. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, and a relatively stationary element adapted to engage said lever and oscillate the same to effect the engagement of said catch with a bar, said element being disposed to effect such engagement at the end of said slide's reciprocation.

77. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, and a relatively movable element adapted to be interposed in the path of travel of said lever as said slide reciprocates, said element being adapted to oscillate said lever to effect the disengagement of said catch from a bar.

78. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, a relatively stationary element adapted to engage said lever and oscillate the same to effect the engagement of said catch with a bar, said element being disposed to effect such engagement at the end of said slide's reciprocation, and a relatively movable element adapted to be interposed in the path of travel of said lever as said slide reciprocates, said element being adapted to oscillate said lever to effect the disengagement of the catch from a bar.

79. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, and a series of manually operable elements respectively adapted to be interposed in the path of travel of said lever as said slide reciprocates, said elements being adapted to oscillate said lever to effect the disengagement of said catch from a bar.

80. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, a relatively stationary element adapted to engage said lever and oscillate the same to effect the engagement of said catch with a bar, said element being disposed to effect such engagement at the end of said slide's reciprocation, and a series of manually operable elements respectively adapted to be interposed in the path of travel of said lever as said slide reciprocates, said element being adapted to oscillate said lever to effect the disengagement of said catch from a bar.

81. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, and an oscillatory key-lever adapted, in one position, to interpose its one end in the path of travel of the lever on said slide as the latter reciprocates and thereby oscillate said slide-lever to effect the disengagement of said catch from a bar.

82. In a typograph machine, the combination with matrix-bars; of shifting mechanism therefor including a slide reciprocable longitudinally of said bars, a pivotal catch carried by said slide and shaped to engage an individual bar, an oscillatory lever mounted on said slide and connected to actuate said catch, an oscillatory key-lever adapted, when depressed, to interpose its one end in the path of travel of the lever on said slide as the latter reciprocates and thereby oscillate said slide-lever to effect the disengagement of said catch from a bar, and a locking member adapted to retain said key-lever in its depressed position.

83. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, and an oscillatory key-lever adapted, in one position, to interpose its one end in the path of travel of the lever on said slide as the latter reciprocates and thereby oscillate said slide-lever to effect the disengagement of said catch from a bar, such end of said key-lever being adapted to inter-engage with said slide-lever, whereby said key-lever is retained in depressed position pending the oscillation of said slide-lever.

84. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, an oscillatory key-lever adapted, when depressed, to interpose its one end in the path of travel of the lever on said slide as the latter reciprocates and thereby oscillate said slide-lever to effect the disengagement of said catch from a bar, such end of said key-lever being adapted to inter-engage with said slide-lever, whereby said key-lever is retained in depressed position pending the oscillation of said slide-lever, and a locking member adapted to retain said key-lever in such depressed position independently of aforesaid inter-engagement.

85. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, an oscillatory key-lever adapted, when depressed, to interpose its one end in the path of travel of the lever on said slide as the latter reciprocates and thereby oscillate said slide-lever to effect the disengagement of said catch from a bar, and a shiftable member adapted in one position to lock said key-lever in such depressed position, said key-lever being adapted, incidentally to its depression, to shift said member into such locking position.

86. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, an oscillatory key-lever adapted, when depressed, to interpose its one end in the path of travel of the lever on said slide as the latter reciprocates and thereby oscillate said slide-lever to effect the disengagement of said catch from a bar, a shiftable member adapted in one position to lock said key-lever in such depressed position, said key-lever being adapted, incidentally to its depression, to shift said member into such locking position, and means on said slide adapted to restore said member to its inoperative position.

87. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, and a series of oscillatory key-levers arranged along said slide and respectively adapted, when depressed, to interpose one end in the path of travel of the lever on said slide as the latter reciprocates and thereby oscillate said slide-lever to effect the disengagement of said catch from a bar.

88. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, a series of oscillatory key-levers arranged along said slide and respectively adapted, when depressed, to interpose one end in the path of travel of the lever on said slide as the latter reciprocates and thereby oscillate said slide-lever to effect the disengagement of said catch from a bar, and a locking member for each of said key-levers adapted to retain the same in its depressed position.

89. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, and a series of oscillatory key-levers arranged along said slide and respectively adapted, when depressed, to interpose one end in the path of travel of the lever on said slide as the latter reciprocates and thereby oscillate said slide-lever to effect the disengagement of said catch from a bar, such end of each key-lever being adapted to inter-engage with said slide-lever, whereby said key-lever is retained in depressed position pending the oscillation of said slide-lever.

90. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, a series of oscillatory key-levers arranged along said slide and respectively adapted, when depressed, to interpose one end in the path of travel of the lever on said slide as the latter reciprocates and thereby oscillate said slide-lever to effect the disengagement of said catch from a bar, such end of each key-lever being adapted to inter-engage with said slide-lever, whereby said key-lever is retained in depressed position pending the oscillation of said slide-lever, and a shiftable member associated with each of said key-levers and adapted in one position to lock said key-lever in its depressed position, said key-lever being adapted, incidentally to its depression to shift said member into such locking position.

91. In a typograph machine, the combination with matrix-bars; of shifting mechanism therefor including a slide reciprocable longitudinally of said bars, a pivotal catch carried by said slide and adapted to engage an individual bar, an oscillatory lever mounted on said slide and connected to actuate said catch, a series of oscillatory key-levers arranged along said slide and respectively adapted, when depressed, to interpose one end in the path of travel of the lever on said slide as the latter reciprocates and thereby oscillate said slide-lever to effect the disengagement of said catch from a bar, such end of each key-lever being adapted to inter-engage with said slide-lever, whereby said key-lever is retained in depressed position pending the oscillation of said slide-lever, and a shiftable member associated with each of said key-levers and adapted in one position to lock said key-lever in its depressed position, said key-lever being adapted, incidentally to its depression to shift said member into such locking position, and means on said slide adapted to restore said members respectively to their inoperative positions incidentally to said slide's reciprocation.

92. In mechanism of the character described, the combination with a suitable support provided with type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups with their thin ends directed toward each other; and mechanism for shifting said bars, said shifting mechanism including a slide reciprocable longitudinally of said bars, a pair of oppositely disposed catches pivotally mounted on said slide and respectively adapted to engage an individual bar in one or the other of said sets of bars, an oscillatory lever mounted on said slide and connected to actuate one of said catches when oscillated in one direction and the other thereof when oscillated in the other direction, and means adapted to engage and oscillate said lever incidentally to reciprocation of said slide in each direction.

93. In mechanism of the character described, the combination with a suitable support provided with type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups with their thin ends directed toward each other; and mechanism for shifting said bars, said shifting mechanism including a slide reciprocable longitudinally of said bars, a pair of oppositely disposed catches pivotally mounted on said slide and respectively adapted to engage an individual bar in one or the other of said sets of bars, an oscillatory lever mounted on said slide and connected to actuate one of said catches when oscillated in one direction and the other thereof when oscillated in the other direction, and two relatively stationary elements respectively adapted to engage said lever and actuate the same to effect the engagement of said catches with bars in predetermined positions of said slide.

94. In mechanism of the character described, the combination with a suitable support provided with type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups with their thin ends directed toward each other; and mechanism for shifting said bars, said shifting mechanism including a slide reciprocable longitudinally of said bars, a pair of oppositely disposed catches pivotally mounted on said slide and respectively adapted to engage an individual bar in one or the other of said sets of bars, an oscillatory lever mounted on said slide and connected to actuate one of said catches when oscillated in one direction and the other thereof when oscillated in the other direction, and two relatively stationary elements respectively adapted to engage said lever and actuate the same to effect the engagement of said catches with bars, said elements being disposed to effect such engagement at the end of said slide's reciprocation in opposite directions, respectively.

95. In mechanism of the character described, the combination with a suitable support provided with type-bar casting means; of two sets of laterally tapered matrix-bars individually movable on said support into varied operative relation to said casting means, the bars of one set bearing series of matrices similar to those of the other set but in reverse order, and such sets of bars being normally collected into separate groups with their thin ends directed toward each other; and mechanism for shifting said bars, said shifting mechanism including a slide reciprocable longitudinally of said bars, a pair of oppositely disposed catches pivotally mounted on said slide and respectively adapted to engage an individual bar in one or the other of said sets of bars, an oscillatory lever mounted on said slide and connected to actuate one of said catches when oscillated in one direction and the other thereof when oscillated in the other direction, and a series of manually operable elements respectively adapted to be interposed in the path of travel of said lever as said slide reciprocates, said elements being adapted to oscillate said lever in one direction or the other, depending upon the direction of reciprocation of said slide, and thereby disengage the corresponding catch from a bar.

96. In mechanism of the character described, the combination with a suitable support provided with type-bar casting means; of matrix-bars individually movable on said support into varied operative relation to said casting means; and means adapted to lock said bars when assembled in such operative relation, said means including a transversely reciprocable member adapted to engage said bars and hold the same with their matrices in alinement, and a depressible member adapted to engage and press down on said reciprocable member.

97. In mechanism of the character described, the combination with a suitable support provided with type-bar casting means; of matrix-bars individually movable on said support into varied operative relation to said casting means; and means adapted to lock said bars when assembled in such operative relation, said means including a transversely reciprocable member adapted to engage said bars and hold the same with their matrices in alinement, and a depressible member adapted to engage and press down on said reciprocable member, said two members being intergeared so as to move in unison.

98. In mechanism of the character described, the combination with a suitable support provided with type-bar casting means; of matrix-bars individually movable on said support into varied operative relation to said casting means; and means adapted to lock said bars when assembled in such operative relation, said means including a transversely reciprocable member adapted to engage said bars and hold the same with their matrices in alinement, a lever oscillatory toward and from said member, and a foot carried by said lever and adapted to press against said member in the depressed position of said lever.

99. In mechanism of the character described, the combination with a suitable support provided with type-bar casting means; of matrix-bars individually movable on said support into varied operative relation to said casting means; and means adapted to lock said bars when assembled in such operative relation, said means including a transversely reciprocable member adapted to engage said bars and hold the same with their matrices in alinement, a lever oscillatory toward and from said member, said member and lever being intergeared so as to move in unison, and a foot carried by said lever and adapted to press against said member in the depressed position of said lever.

100. In mechanism of the character described, the combination with a suitable support provided with type-bar casting means; of matrix-bars individually movable on said support into varied operative relation to said casting means; and means adapted to lock said bars when assembled in such operative relation, said means including a transversely reciprocable member adapted to engage said bars and hold the same with their matrices in alinement, a lever oscillatory toward and from said member, said member and lever being intergeared so as to move in unison, a foot movably carried by said lever and adapted to press against said member in the depressed position of said lever, and means for thus actuating said foot.

101. In mechanism of the character described, the combination with a suitable support provided with type-bar casting means; of matrix-bars individually movable on said support into varied operative relation to said casting means; and means adapted to lock said bars when assembled in such operative relation, said means including a transversely reciprocable member adapted to engage said bars and hold the same with their matrices in alinement, a lever oscillatory toward and from said member, said member and lever being intergeared so as to move in unison, a foot movably carried by said lever and adapted to press against said member in the depressed position of said lever, means for thus actuating said foot, and other means for securing said lever in desired position, said actuating means being also adapted to control said securing means.

Signed by us, this 16th day of September, 1913.

OLIVER W. JOHNSON.
WILLIAM A. READE.

Attested by:
D. S. DAVIS,
JNO. F. OBERLIN.

Copies of this patent may be obtained for five cents each, by addressing the "Commissioner of Patents, Washington, D. C."